US008951586B2

(12) United States Patent
Bullard et al.

(10) Patent No.: US 8,951,586 B2
(45) Date of Patent: *Feb. 10, 2015

(54) PROCESS FOR THE REDUCTION IN MICROBIAL ACTIVITY IN PROTEIN PRODUCT WATER PROCESSING TANKS FOR INCREASED TANK WATER UTILITY AND CONSERVATION

(71) Applicant: Zeco, Inc., Chattanooga, TN (US)

(72) Inventors: Jonathon R. Bullard, Chattanooga, TN (US); Robert C. Bullard, Signal Mountain, TN (US); Battle Glascock, Soddy Daisy, TN (US)

(73) Assignee: Zeco, Inc., Chattanooga, TN (US)

( * ) Notice: Subject to any disclaimer, the term of this patent is extended or adjusted under 35 U.S.C. 154(b) by 157 days.

This patent is subject to a terminal disclaimer.

(21) Appl. No.: 13/764,199

(22) Filed: Feb. 11, 2013

(65) Prior Publication Data

US 2013/0153516 A1     Jun. 20, 2013

Related U.S. Application Data

(63) Continuation of application No. 12/911,539, filed on Oct. 25, 2010, now Pat. No. 8,372,461.

(60) Provisional application No. 61/272,708, filed on Oct. 23, 2009.

(51) Int. Cl.
    *A23L 3/3454*         (2006.01)

(52) U.S. Cl.
    USPC .............................. 426/66; 426/321; 426/326

(58) Field of Classification Search
    CPC .......... A23B 4/20; A23B 4/12; A23L 3/3481; C02F 1/722; C02F 2103/023; C02F 2103/22; C02F 2303/04; C02F 2305/02; C02F 3/00
    USPC ........................................... 426/66, 321, 326
    See application file for complete search history.

(56) References Cited

U.S. PATENT DOCUMENTS

| 4,790,943 | A | 12/1988 | Dunn et al. |
| 5,053,140 | A | 10/1991 | Hurst |
| 5,069,922 | A | 12/1991 | Brotsky et al. |
| 5,143,739 | A | 9/1992 | Bender et al. |
| 5,173,190 | A | 12/1992 | Picek |
| 5,178,755 | A | 1/1993 | LaCrosse |
| 5,200,189 | A | 4/1993 | Oakes et al. |
| 5,234,703 | A | 8/1993 | Guthery |
| 5,364,650 | A | 11/1994 | Guthery |
| 5,435,808 | A | 7/1995 | Holzhauer et al. |
| 5,489,434 | A | 2/1996 | Oakes et al. |
| 5,593,598 | A | 1/1997 | McGinness et al. |
| 5,632,676 | A | 5/1997 | Kurschner et al. |
| 5,635,231 | A | 6/1997 | Bender et al. |
| 5,728,305 | A | 3/1998 | Hawkinson |
| 6,010,729 | A | 1/2000 | Gutzmann et al. |
| 6,103,286 | A | 8/2000 | Gutzmann et al. |
| 6,113,963 | A | 9/2000 | Gutzmann et al. |
| 6,183,807 | B1 | 2/2001 | Gutzmann et al. |
| 6,514,556 | B2 | 2/2003 | Hilgren et al. |
| 6,545,047 | B2 | 4/2003 | Gutzmann et al. |
| 6,627,593 | B2 | 9/2003 | Hei et al. |
| 6,865,895 | B2 | 3/2005 | Bass |
| 6,964,788 | B2 | 11/2005 | Phebus et al. |
| 7,077,967 | B2 | 7/2006 | Perkins et al. |
| 7,754,670 | B2 | 7/2010 | Lange et al. |
| 7,887,641 | B2 | 2/2011 | Man et al. |
| 8,020,520 | B2 | 9/2011 | Hilgren et al. |
| 8,029,693 | B2 | 10/2011 | Dada et al. |
| 8,030,351 | B2 | 10/2011 | Gutzmann et al. |
| 8,043,650 | B2 | 10/2011 | Gutzmann et al. |
| 8,128,976 | B2 | 3/2012 | Man et al. |
| 8,372,461 | B2 | 2/2013 | Bullard et al. |
| 2003/0070691 | A1 | 4/2003 | Giletto et al. |
| 2003/0211169 | A1 | 11/2003 | Tabasso |

(Continued)

FOREIGN PATENT DOCUMENTS

| GB | 947688 | 1/1964 |
| WO | WO 99/00025 | 1/1999 |

(Continued)

OTHER PUBLICATIONS

Georgia FoodPac Food Processing Advisory Council, Georgia's Traditional Industries Program for Food Processing—Fiscal Year 2004-2005 Report to Industry, 24 pages.

Russell, "Water Reuse in Poultry Processing Now Addressed in the HACCP Program", The University of Georgia Cooperative Extension, Jan. 2013, 4 pages.

Saravia et al., "Economic Analysis of Recycling Chiller Water in Poultry-Processing Plants Using Ultrafiltration Membrane Systems", J. Food Distribution Research, 36(1):161-166, Mar. 2005.

Mohan et al. "Role of Peroxyacetic Acid, Octanoic Acid, Malic Acid, and Potassium Lactate on the Microbiological and Instrumental Color Characteristics of Ground Beef", J. Food Science, vol. 77, No. 4, 2012, pp. M188-M193.

(Continued)

*Primary Examiner* — Helen F Heggestad
(74) *Attorney, Agent, or Firm* — Patterson Thuente Pedersen, P.A.

(57) ABSTRACT

A method for extending the use of water during the production of products for human consumption in food production facilities for an extended period of time of at least two production days and up to seven production days by delivering an initial chemical charge at the beginning of each production day to return the process water to the desired antimicrobial solution concentration to provide acceptable antimicrobial control of the process water over the extended period of time. The method providing acceptable antimicrobial control in the processing of any protein or non-protein based food products that require batch or continuous chilling as part of the production process. The length of time that the water may be used in a processing tank may be dramatically and safely increased before the processing tank is emptied for cleaning, sanitizing and refilling.

26 Claims, No Drawings

(56) References Cited

U.S. PATENT DOCUMENTS

| | | |
|---|---|---|
| 2006/0113506 A1 | 6/2006 | Man et al. |
| 2008/0171117 A1 | 7/2008 | Mixon et al. |
| 2009/0043123 A1 | 2/2009 | Copenhafer et al. |
| 2009/0145859 A1 | 6/2009 | Man et al. |
| 2009/0147822 A1 | 6/2009 | Tokhtuev et al. |
| 2009/0324790 A1 | 12/2009 | Hilgren et al. |
| 2010/0196503 A1 | 8/2010 | Heisig et al. |
| 2010/0227000 A1 | 9/2010 | Ames et al. |
| 2011/0027383 A1 | 2/2011 | Hilgren et al. |
| 2011/0135534 A1 | 6/2011 | Bates et al. |
| 2011/0177145 A1 | 7/2011 | Erkenbrecher, Jr. et al. |
| 2011/0220155 A1 | 9/2011 | Man et al. |
| 2011/0305805 A1 | 12/2011 | Gutzmann et al. |
| 2011/0311691 A1 | 12/2011 | Gutzmann et al. |
| 2012/0244261 A1 | 9/2012 | Harvey et al. |
| 2012/0245228 A1 | 9/2012 | Harvey et al. |

FOREIGN PATENT DOCUMENTS

| | | |
|---|---|---|
| WO | WO 00/48951 | 8/2000 |
| WO | WO 02/054866 A1 | 7/2002 |
| WO | WO 2009/027857 A1 | 3/2009 |

OTHER PUBLICATIONS

Quilo et al., "Microbial, instrumental color and sensory characteristics of inoculated ground beef produced using potassium lactate, sodium metasilicate or peroxyacetic acid as multiple antimicrobial interventions", Meat Science, 84, 2010, pp. 470-476.

Harris et al., "Microbiological and organoleptic characteristics of beef trim and ground beef treated with acetic acid, lactic acid, acidified sodium chlorite, or sterile water in a simulated commercial processing environment to reduce *Escherichia coli* O157:H7 and *Salmonella*", Meat Science, 90, 2012, pp. 783-788.

Bell, "Reduction of doodborne mirco-organisms on beef carcass tissue using acetic acid, sodium bicarbonate, and hydrogen peroxide spray washes", Food Microbiology (1997), 14, 439-448.

Labadie, "Development of a New Technique for Obtaining Axenic Meat", European J. Appl. Microbiol. (1977), 4, 67-73.

Gusev, "Peracetic Acid for *Salmonella* Decontamination in Poultry Carcasses", Veterinary Disease Control Review (2007), 4 pages.

Dorn, "Examination of *Salmonella* Decontamination of Broiler Carcasses", (1988), 28 pages.

Joseph, "Meat Decontamination", University of Bristol (1997), pp. 1, 8-9, 12, 33-35, 38, 43, 64-91, 98-99 and 104-105.

Rose, "USDA Policy on Water Reuse in Meat and Poultry Plants", American Meat Science Association, 45th Reciprocal Meat Conference, vol. 45, 1992, pp. 147-149.

Application and File history for U.S. Appl. No. 12/911,539, filed Oct. 25, 2010. Inventors: Bullard et al.

PROCESS FOR THE REDUCTION IN MICROBIAL ACTIVITY IN PROTEIN PRODUCT WATER PROCESSING TANKS FOR INCREASED TANK WATER UTILITY AND CONSERVATION

RELATED APPLICATION

This application is a continuation of application Ser. No. 12/911,539 filed Oct. 25, 2010, which claims the benefit of U.S. Provisional Application No. 61/272,708, filed Oct. 23, 2009, each of which is hereby fully incorporated herein by reference.

FIELD OF THE INVENTION

This invention relates to a particular process intended for the chilling of protein and non-protein based food products in a water bath which lowers product temperature, helps control microbial growth, and prepares the product for further processing and packing. Although the focus of this present disclosure is on the use of the invention in a chilled water bath, the invention's use and application is not limited to this process alone. This invention can also be utilized to control microbial activity and to extend the usable time between filling and draining operations for any soaking, dipping, quenching, rinsing, scalding, washing, cooling, heating, or any other type processing bath in which a non-food product or a food product intended for human consumption is processed. The application and use of the disclosed invention is not, therefore, limited only to the chiller process but for the sake of brevity, this disclosure will reference only a chilled water process for use in the rapid chilling of a protein product intended for human consumption.

BACKGROUND OF THE INVENTION

The world population has grown to point where mass production of the foods that we consume is no longer a luxury but a requirement. Local farmers, providing food and food products directly to the marketplace, cannot meet the demands of modern society. The food supply chain now incorporates very large, complex farms and high speed and very high volume processing plants to satisfy the need for mass processing and production of food. Maintaining a safe food supply chain relies on the dedication of those working in the supply chain, the processing plants and also on the third party oversight of various Federal agencies whose regulations support and mandate food safety.

With two major exceptions, the physical process of taking an animal from the farm to the consumer has changed very little over time. The introduction of refrigeration, and the implementation of various chemistries to help maintain sanitary conditions and to control microbiology, has given modern food processors an advantage not enjoyed by food producers of a century ago. Refrigeration and chemical intervention practices have become an integral part of food processing facility operations. These technologies have enabled the high speed, high volume output of the large processing facilities that could not have been possible in times past without significant concern for consumer safety. With large scale and continuous processing methods being employed by large processors of protein products, or any other product that is susceptible to microbiological contamination, the concern for the control of microbiology and the safety of the food supply chain is of paramount importance.

Another concern, as the demand for food products increases, is the impact on natural resources created by this demand. The ecological impact is directly affected by this growth and therefore new processes must be developed to reduce the impact any given process has on the environment. The ecological impact that a food processing plant has on the environment is no longer a passing concern but a major part of operations and planning. Entire processes are built around the control and conservation of natural resources such as water. Older, outdated and less efficient processes are being replaced at significant cost with more efficient and less wasteful processes that maximizes the utility of available resources. No longer can a plant operate without concern for the conservation and sustainability of natural resources.

To insure that the food supply chain in modern society is maintained at the highest levels of safety for the consumer, the plant's employees, and the overall environment, there are federal agencies that monitor the processors operations so that a continually safe food supply is assured and the environmental impact and utilization of natural resources is as safe and efficient as possible.

Modern food processing methods are scrutinized by government agencies to ensure compliance with safe handling and processing guidelines designed to minimize issues of food safety in the supply chain Regulations and routine inspections of systems and processes by Federal agencies such as the USDA, EPA and OSHA, mandate a government-industry alliance that helps ensure that every effort is made to deliver the safest for product possible to the consumer.

Very innovative approaches to the systems and methods used in processing facilities have been implemented to create profits for industry while maintaining low consumer cost of the final product. As new processes are developed, the federal agencies that have jurisdiction over any particular process are called upon to review the new approach and to ensure that the new innovation meets the current guidelines for safety. The higher the processors output, the higher the risk of microbiological contamination, and therefore the more innovative the processor must be to combat this ever present threat to the food chain safety. As new risks are found, federal guidelines become more stringent.

Large scale refrigeration systems, used to help control microbial growth in various processing applications, have helped the food processing industry to remain in compliance with food safety goals. Refrigeration applications and processes are implemented at various locations in the processing operation to ensure maximization of microbiology control and shelf life. Depending on the particular product being processed—beef, pork, poultry and fish for example—and the particular operation taking place, various methods of achieving this reduction in product temperature are employed.

In poultry processing for example, submersion in large chilled water baths is the allowed and preferred method for the rapid reduction in carcass temperature after evisceration. Other means of accomplishing the reduction in temperature for beef or pork products are utilized and will not be considered in this disclosure as that they do not currently utilize a large chilled water bath for the purpose.

BRIEF DESCRIPTION OF THE RELATED ART

Several patents have been granted which involve the use of Peracetic Acid/Hydrogen Peroxide blends for direct application to food products intended for human consumption. As well other approved applications are for hard surface sanitizing. As detailed in U.S. Pat. No. 5,632,676 the use of PAA (Peracetic Acid) at concentrations of 100 to 2000 parts per million effectively reduces the bacterial level found on the surface of fowl to a level that will not produce disease in humans. In U.S. Pat. No. 6,514,556, the use of a PAA blend with other components is described where this material can be applied to the surface of fowl for the significant reduction in microbial activity. Both of these patents are explicit in detail of the effectiveness of PAA as an effective antimicrobial material with U.S. Pat. No. 6,514,556 providing detail on actual applications and methods for applying the chemistry.

The disclosure referenced in U.S. Pat. No. 6,514,556 is not directed at the specific use of the chemistry for the extension of time between when a tank is filled and when it is drained. Neither patent provides a detailed method for the precise application of a PAA chemistry—including injection points, locations with reference to the chiller water flow stream, volume and location of water reuse piping, and injection points that defines a procedure that provides for process water to used for an extended period of time as defined in this patent.

Chiller Process

The chiller process, as it is commonly termed in the poultry industry, is designed to provide the fastest and most economical method of achieving a rapid temperature decrease for high volume processing of eviscerated product in a continuous operation. According to the latest federally mandated guidelines for the use of a continuous water chilling operation in a poultry processing facility, a processor must provide a means for rapidly chilling a carcass to a temperature below 40° F. to minimize microbial growth and to preserve product quality.

The means by which this initial chill operation is accomplished in large production facilities is by feeding a continual flow of product on a belt conveyor into the lead-in section of a large chilled water tank and ensuring that the product is submerged continually, typically with a water temperature set at approximately 34° F.

In one typical method, the process incorporates a large tank fitted with a sectionalized and gated conveyor that provides separate sections where the product is loaded. The gates are mounted on a chain-type conveyor and continually move through the chilled water bath with the gates providing segregation from one load to another. The gates continuously push a load of product through the chilled water bath, from the lead-in section to the lead-out section, at a speed that is designed to provide ample dwell time for the intended cooling purpose. Another method of accomplishing the same material handling operation is the use of a large diameter auger placed in the chiller tank in lieu of the moving gates described above. The auger flights determine the volume of product that can be loaded in each section and the auger rotational speed as well as the total length of the tank determines the dwell time the product will be allowed to remain in the chilled bath.

In typical operations, a processor will provide at least two and as many as four separate chilled water tanks all connected in series with the product being transferred from one tank to another via specialized material handling systems located at each end of the tanks. The separate tanks provide a complete separation of the water volumes to ensure that as the process continues, the product will be subjected to cleaner and cleaner water.

The material handling systems located in between each tank in the series support and facilitates tank separation and the transfer of product from one tank to another. Once the product has made a complete traverse from the entry to end of a tank, it is removed from the current tank and transferred over to the next tank in the series.

When eviscerated product enters the first chiller tank system, the carcass is covered with surface contaminants such as blood, loose flesh material, and fecal matter that may be left on the carcass from upstream processes. These materials are a natural result of the evisceration process and therefore the chilled water tank acts as a surface rinse as well as a means of cooling the product. The greatest portion of these surface contaminants are generally flushed from the surface of the product as it traverses the first tank, which usually becomes heavily soiled as a result.

As part of the chiller tank system, it is also common to design cascade piping which ties the total number or a portion of the processing tanks together as far as process water flow is concerned. This practice is designed to permit water contained in a downstream or "cleaner" tank to be delivered to an upstream or relatively more highly soiled tank in a fixed and relatively small volume. This ensures that relatively clean water from a downstream tank is delivered to a relatively heavily soiled upstream tank, providing a semi fresh water supply to the more heavily soiled tanks. Process water from the first, or most heavily soiled, tank in the product flow line is allowed to overflow to drain. This water volume is returned to the process by the supply of potable water though what is typically know as 'make up water' piping delivered to various tanks in the process line.

In typical operations, the water volume in each tank is continually lowered due to water carryover on the product surface from one tank to another. This volume of water plus the carryover volume must be supplied back to the chiller with fresh make up water. A lower volume of makeup water is allowed as long as an approved filtration means is employed on the chilling recirculation loop in each tank.

In all chiller applications, the means by which the water temperature is maintained is by the utilization of a chilled water recirculation loop. This water cooling loop uses a pump and heat exchanger that pulls a certain volume of processing water from the chilled water tank, through a chiller heat exchanger, then back to the tank. This produces a counter flow system that ensures that the lead-out product will be continually exposed to the coldest water temperature.

This process is continuous in large processing facilities and is typically run for two shifts of operation. At the end of the last shift or production day, the typical practice is to completely drain the total chiller system and send this volume of process water to the processor's wastewater treatment system for treatment and discharge from the plant. The processor must provide a waste water treatment system that can handle the total volume of water in a single discharge at the close of the production day or send it to an approved facility that will treat the wastewater volume for the facility. The chiller tanks are then rinsed, cleaned, and sanitized in a very labor intensive operation that takes place at the close of each production day.

Prior to the next day's production shift start-up, the processor must refill all of the chiller tanks with water, allowing ample time to chill the inlet water down to the processing temperature prior to commencing production. Based on the high output demand of the production plants, these chiller tanks and systems may have total water volumes from 60,000 gallons of water to as high as 300,000 gallons or higher depending on the total production volume of the plant.

When considering the cost of cooling the inlet water down from its initial temperature to the required processing temperature, it is apparent that a significant spike in the in-house refrigeration system is seen. By analysis of the total volume of water and its initial inlet temperature, the refrigeration load can be as high 6,250 tons of refrigeration for a 300,000 gallon process with an inlet temperature of 65° F. and a one hour cool down rate to 35° F.

The total volume of water in the chiller operation makes up a large percentage of the total volume used in the plant. Moving this amount of water into and out of the chiller tanks requires very large pumping systems and, therefore, the electrical cost for mass transfer is quite large as well.

The requirement that all of the process water must be treated in the plant waste water system also requires a large cost and a very large volume of water that must be handled in a very short period of time.

Reuse Water Process

The term "reuse" water as it is used within this disclosure and in USDA regulations means water that has been allowed to contact the surface of raw product with subsequent contact allowed on the surface of downstream raw product.

The water volume used in a chiller application is in contact with the outer surfaces of raw product and, according to USDA guidelines, this water as well as the overall process is considered to be classified as a water reuse process. This classification as determined by the USDA requires that the entire process be made part of the plant HACCP program for chemical, physical, and microbiology control.

Hazard Analysis and Critical Control Point (HACCP) is a systematic, preventive process that relies on the control of physical, chemical, and biological hazards rather than finished product inspection as the means of ensuring food safety. HACCP is used in the food industry to identify potential food safety hazards so that key production steps, known as Critical Control Points (CCPs) can be monitored to reduce or eliminate the risk of hazards potentially present. The HACCP system is used in all stages of food production and preparation processes, including packaging, distribution, etc.

Based on USDA regulations, water reuse applications must be in compliance with 9 CFR 416.2 (g)(3) These regulations state that water that has contacted raw product may be reused for the same purpose or up-stream provided that measures are taken to reduce physical, chemical and microbiological contamination or adulteration of the product As part of the HAACP program, and as a means to monitor the antimicrobial potential of the chemistry in a water reuse process, plant operations personnel and USDA will pull water samples from particular physical locations, as well as from product surfaces at various locations within the process, to conduct testing for live microbial presence. This testing is often referred to as a Total Plate Count, or TPC.

Other processes, such as the scalder operation in a poultry plant for example, use the same re-circulated or reuse type water circulation systems, in most cases, and therefore fall into the same USDA guidelines for the plant HACCP program.

Chiller Microbial Control

In order to control microbiology in chiller tanks, it is a typical practice to add specialized chemistry to the tanks throughout the processing day.

Heretofore, the use of chlorine has been the prevalent chemistry of choice, but based on the relatively new development of newer and more environmentally friendly chemistries, and problems associated with chlorine being trapped in fats and oils that are contained in the process water, chlorine is being replaced as referenced below. In a study conducted by Dr. Scott Russell, et al, of the University of Georgia, and as detailed in several articles referencing the use of recycled or reuse water as defined by the USDA, it was found that the chlorinated water tested in commercial chiller process used in a poultry processing plant was not providing the efficacy anticipated by the processor, even though the chiller water contained approximately 40 ppm (parts per million) of total chlorine and 1 ppm free chlorine. It was found that the majority of chlorine in the water was bound to the large amounts of organic material contained in the recycled water and was, therefore, unavailable to kill Salmonella sp.

When considering the practice of using the total volume of water in the chiller process for one day and taking into account the economic and ecological impact this one process has on processing plant operations, it is easy to see why a processor would strive for a much easier and less costly processing system. The processor would greatly benefit from the development of ways in which to lower the overall cost of the process without adversely affecting product quality while meeting the relevant Federal guidelines set for plant operations.

The invention disclosed herein provides a distinct advantage to the processor. This invention enables the extended use of chilled water, scalder water, or any other large volume of water used for processing protein and non protein-based products that must comply with guidelines for reuse water. This invention allows for the extension of time between fill and drain operations and complies with all existing USDA FSIS requirements for this type of application. This invention provides a significant savings in operations as well as a dramatic reduction in the environmental impact of sending the chiller operation's extremely large volume of water through the waste processing system on a daily basis, and therefore would be very advantageous for the processor.

DETAILED DESCRIPTION OF THE DRAWINGS

The invention disclosure provided below details the method, equipment and technology that will enable the food processor to extend the time between the initial filling and the subsequent draining of a chilled water process tank. This invention provides significant savings for the processor in electrical cost, waste treatment cost, natural resource use and consumption as well as an overall reduction in sanitation cost. The invention will allow for the extended time of use for process chiller water from the present two shift operation to as many as 5 and up to as many as 7 days before the total chiller tank volume is drained, cleaned, and sanitized.

It has been found that by properly selecting certain chemistries as well as providing chemical dosing systems that allow for the precise addition of these chemistries to a process water chiller tank, and providing specific chemical addition points that are based on the particular design of the processor's chiller system, the time that a processor can utilize the full volume of chiller water between fill and drain cycles can be significantly extended from the present 2 shift time to up to as many as 7 days and still allow for compliance with USDA regulations stated in 9 CFR 416.2 (g)(3).

It has been found and tested in a processing facility with oversight by local USDA representatives that the time between when a chiller processing tank is filled and when it is drained has been extended from a two shift operation to up to seven (7) production days in a row.

The process involves the use of specialized chemistries consisting of a Peracetic Acid (PAA)/Hydrogen Peroxide blend injected into the process tank or chiller recirculation loop in certain areas of the process flow to allow complete disbursement of the active ingredients of the chemistry throughout the system. The means by which the chemistry is added to the process water volume, along with the particular locations that are selected as chemical injection points (based on the processors particular chiller system design) are critical to successfully achieving the goal of extending the length of time water can be used, in compliance with USDA regulations.

Peracetic Acid/Hydrogen Peroxide based chemistries have been evaluated and have been given regulatory approval for use in certain applications in the food processing industries by FSIS. FSIS categorizes these chemistries in Directive 7120.1 as appropriate for use in "Process water for washing, rinsing, cooling, or otherwise for processing meat carcasses, parts, trim, and organs; and process water applied to poultry carcasses as a spray, wash, rinse, dip, chiller water, scald water and OLR (On Line Reprocessing) applications."

It has been found that the process water volume in a chiller tank or tanks can be allowed to be retained in the chill system for use continually for up to 7 days by the use of a certain PAA chemistry as well as by the utilization of the proper dosing systems and chemical injection points with chemical concentrations and blends specific to the application. Successful compliance with the USDA regulations for the extension of utility time for chilled water has been accomplished with both a 15% Peracetic Acid/10% Hydrogen Peroxide blend and a 15% Peracetic Acid/5% Hydrogen Peroxide blend.

The concentration of the PAA within the chiller must be between 10 parts per million (ppm) and 230 ppm. Further, it was found that even better control was established between 20 ppm and 140 ppm, and the best results between 30 ppm and 120 ppm depending on the product being processed, the soil loading of the product, the chiller process design and the production rate of the process.

The PAA may be injected into the chiller to affect the water use extension time in several ways. One method of injection involves the delivery of the concentrated chemistry to the discharge location of the chiller make up water supply pipe just prior to its delivery to the chiller tank.

In another successful test, the PAA chemistry was injected directly into the chiller tank volume at certain locations in the chiller tank that provide complete disbursement and distribution of the chemistry as it is delivered to the tank volume.

It was found that, under certain conditions, it is desirable to treat the full chilled water tank volume by pre-charging the tank with the proper volumes of PAA chemistry prior to the start of the production day. This initial filling/charging operation is provided by the specialized chemical dosing systems and equipment developed specifically for the purpose of extending the chilled water utility time.

Typical best results demonstrated that, at the beginning of each production day, a predetermined amount of PAA chemistry is delivered to the tank by sensing probes that are made part of the chemical dosing equipment developed specifically for this application or by determination of the tank concentration by operational personnel conducting manual chemical titration test. This initial chemical charge, no matter how its volume is determined, is delivered to the process tanks automatically through the specialized chemical dosing system. Appropriate dosage concentrations are determined either through in-line sensors or by manual titration processes. The goal of either system is to return the chiller water to the predetermined PAA concentration level established as effective in a particular system. Once the full tank volume has been provided with the proper chemical dosage to bring the chemical concentration to a level of between 10 parts per million (ppm) and 230 ppm or up to between 20 ppm and 140 ppm or better yet up to between 30 ppm and 120 ppm PAA depending on the overall process design and production rate, the tank is released to production for its intended processing application.

For the remainder of the production day, the tank chemical concentration is maintained at between 10 parts per million (ppm) and 230 ppm or up to between 20 ppm and 140 ppm or better yet up to between 30 ppm and 120 ppm PAA where this chemical concentration is continually maintained by specialized chemical concentration sensing probes or probes that are made part of the chemical dosing equipment developed specifically for this application or by determination of the tank concentration by operational personnel conducting manual chemical titration test.

The specialized chemical dosing and control system continually reads process, make up, or reuse water flow chemical concentrations and adjusts the delivery of PAA based on the process water needs. At the end of the day the system is shut down during the sanitation shift and the chiller water is left in the body of the chiller. At this time, the red water system may be cleaned using a 'clean-in-place' system (CIP).

After any CIP system has been run, the recirculation pipes are reconnected and the water is re-circulated through the pipes. At this time, another predetermined amount of PAA may or may not be dispensed into the chiller. The makeup water is treated in accordance with the program that has been established. This same process is followed until the end of the production week, at which point the chillers are drained, cleaned, and sanitized.

As an example of the system and process use, the total volume of water that can be saved in a given production week of 5 production days and based on a process that utilizes four chiller tanks each having a total process water volume of 70,000 gallons, the water conservation for that week would be 1,050,000 gallons of water.

In addition to the ecological and economic savings seen thought the use of this invention in water conservation, the electrical cost associated with moving this large volume of water throughout the process is drastically reduced.

It can also be demonstrated that there is a very significant reduction in the electrical cost of the refrigeration system, as the utilization of this invention provides a significantly lower heat load in the process water initial chill at the beginning of the production day. It has been shown that when using the invention, the residual chilled water tank temperature remains as little as 4° F. above the processing temperature seen at the end of the production day. Typically, the water temperature that is delivered to the chiller tanks using potable water is approximately 65° F. The refrigeration system must chill the total water volume down to production temperatures prior to the initiation of the processing day. This is a significant cost savings, estimated to be approximately $500.00 per day for the processor, utilizing the process volumes referenced in the previous example, and provides other beneficial results such as a reduction in refrigeration run times per ton per year, thus reducing refrigeration maintenance cost and system breakdowns. It also allows for faster start up time, thus taking pressure off sanitation crews.

The use of this invention also reduces the cost of sanitation since the chill water tanks are no longer require to be rinsed, cleaned, and sanitized daily, as normally required.

The invention claimed is:

1. A method for extending the use of water during the production of products for human consumption, the method comprising:

filling a chiller processing tank with a source of water;

delivering an initial amount of peracetic acid to the chiller processing tank to provide a chiller processing bath having a starting concentration from about 10 ppm to about 230 ppm of an aqueous peracetic acid solution within the chiller processing tank;

using the chiller processing bath having the aqueous peracetic acid solution for a first production day in the production of products for human consumption;

shutting down production using the processing bath at the end of the first production day;

retaining the chiller processing bath having the remaining aqueous peracetic acid solution within the chiller processing tank at the end of the first production day;

recharging the chiller processing bath at the beginning of a next production day to the starting concentration from about 10 ppm to about 230 ppm of the aqueous peracetic acid solution;

using the chiller processing bath having the aqueous peracetic acid solution for at least a portion of the next production day in the production of products for human consumption;

shutting down production using the chiller processing bath at the end of the next production day; and draining the chiller processing bath from the processing tank;

wherein the method extends the use of water a period of time between the filling step and the subsequent draining step, the period of time extended from more than the first production day up to seven consecutive production days before the draining step is conducted.

2. The method of claim 1, wherein the first production day comprises a two shift operation.

3. The method of claim 1, wherein the starting concentration of the aqueous peracetic acid solution is about 10 ppm to about 120 ppm.

4. The method of claim 1, further comprising maintaining the aqueous peracetic acid solution concentration from about 10 ppm to about 230 ppm within the chiller processing bath during each of the respective production days.

5. The method of claim 4, further comprising using sensors to provide sensor data about a working concentration of peracetic acid in the chiller processing bath; and adding a source of peracetic acid to the chiller processing bath based on the sensor data to maintain the aqueous peracetic acid solution concentration from about 10 ppm to about 230 ppm.

6. The method of claim 1, further comprising cleaning the chiller processing tank, rinsing the chiller processing tank, sanitizing the chiller processing tank, or combinations thereof, after the chiller processing bath is drained from the chiller processing tank.

7. The method of claim 1, wherein the steps of using the chiller processing bath having the aqueous peracetic acid solution during any of the respective production days in the production of products for human consumption comprises contacting one or more products for human consumption with the chiller processing bath.

8. The method of claim 7, wherein the overflow of the chiller processing bath is used in the production of products for human consumption during an upstream operation chosen from soaking, dipping, quenching, rinsing, scalding, washing, cooling, or heating.

9. The method of claim 1, wherein the steps of shutting down production using the processing bath, retaining the processing bath having the remaining aqueous peracetic acid solution within the processing tank, and recharging the processing bath at the beginning of a next production day to the starting concentration from about 10 ppm to about 230 ppm of the aqueous peracetic acid solution, are each repeated at least once to extend the period of time between the filling step and the subsequent draining step from about three production days up to seven production days.

10. The method of claim 9, wherein each production day comprises a two shift operation.

11. The method of claim 1, wherein the chiller processing tank comprises a means for maintaining a water temperature such that the production of products for human consumption reaches a temperature below about 40° F.

12. The method of claim 1, wherein the step of delivering the initial amount of peracetic acid to the chiller processing tank comprises delivering a concentrated amount of peracetic acid within a makeup water supply to the chiller processing tank.

13. The method of claim 1, wherein the step of recharging the chiller processing bath at the beginning of the next production day comprises delivering a concentrated amount of peracetic acid within a makeup water supply to the chiller processing tank.

14. The method of claim 1, further comprising maintaining the aqueous peracetic acid solution concentration from about 10 ppm to about 230 ppm within the chiller processing tank during each of the respective production days.

15. The method of claim 14, wherein the step of maintaining the aqueous peracetic acid solution concentration from about 10 ppm to about 230 ppm within the chiller processing tank during each of the respective production days comprises delivering a concentrated amount of peracetic acid within a makeup water supply to the chiller processing tank.

16. The method of claim 14, further comprising using sensors to provide sensor data about a working concentration of peracetic acid in the chiller processing bath; and adding a source of peracetic acid to the chiller processing bath based on the sensor data to maintain the aqueous peracetic acid solution concentration from about 10 ppm to about 230 ppm.

17. A method comprising:

providing a chiller processing tank system having a chiller process bath comprising an aqueous antimicrobial intervention solution, the aqueous antimicrobial intervention solution comprising peracetic acid at a predetermined initial chemical concentration of about 10 ppm up to about 230 ppm;

using the aqueous antimicrobial intervention solution during a first production day in the production of products for human consumption;

maintaining an acceptable concentration of the aqueous antimicrobial intervention solution from about 10 ppm to about 230 ppm of peracetic acid in the aqueous antimicrobial intervention solution during the first production day;

shutting down production using the chiller process bath at the end of the first production day;

retaining the remaining aqueous antimicrobial intervention solution within the chiller processing tank system at the end of the first production day;

recharging the chiller process bath comprising the aqueous antimicrobial intervention solution retained within the chiller processing tank system to the predetermined chemical concentration of about 10 ppm to about 230 ppm of peracetic acid at the beginning of a next production day;

using the aqueous antimicrobial intervention solution during the next production day in the production of products for human consumption;

maintaining the acceptable concentration of the aqueous antimicrobial intervention solution from about 10 ppm to about 230 ppm of peracetic acid in the aqueous antimicrobial intervention solution during the next production day; and draining the aqueous antimicrobial intervention solution from the chiller processing tank system;

wherein the steps of shutting down the chiller processing tank system, retaining the remaining aqueous antimicrobial intervention solution within the chiller processing tank system, and recharging the chiller process bath, can each be repeated to provide two or more production days up to about seven production days before conducting the draining step.

18. The method of claim 17, wherein the retaining step retains the remaining aqueous antimicrobial intervention solution within the chiller processing tank system at a temperature lower than ambient temperature.

19. The method of claim 17, wherein the predetermined initial chemical concentration of peracetic acid at the beginning of any of the production days is between about 10 ppm and about 140 ppm.

20. A method of production of products for human consumption while extending a useful lifetime of water used during the production of products for human consumption, the method comprising:
  retaining an aqueous peracetic acid solution within a chiller processing tank system at the end of a first production day;
  recharging the aqueous peracetic acid solution retained within the chiller processing tank system to a concentration from about 10 ppm up to about 230 ppm of aqueous peracetic acid solution within the chiller processing tank system at the beginning of a next production day;
  using the aqueous peracetic acid solution during the next production day in the production of products for human consumption; and
  draining the chiller processing tank system.

21. The method of claim 20, wherein the steps of retaining the remaining aqueous peracetic acid solution within the chiller processing tank system and recharging the aqueous peracetic acid solution retained within the chiller processing tank system to the concentration from about 10 ppm up to about 230 ppm of aqueous peracetic acid solution within the chiller processing tank system at the beginning of the next production day are each repeated at least once to provide between three and seven production days before conducting the step of draining the chiller processing tank system.

22. The process of claim 20, further comprising maintaining an acceptable concentration of about 10 ppm up to about 230 ppm of peracetic acid in the aqueous antimicrobial intervention solution during each of the respective production days.

23. The method of claim 22, wherein the acceptable concentration of the aqueous peracetic acid solution is maintained at about 10 ppm to about 120 ppm.

24. The method of claim 20, further comprising using sensors to provide sensor data about a working concentration of peracetic acid in the chiller processing bath; and adding a source of peracetic acid to the chiller processing bath based on the sensor data to maintain the aqueous peracetic acid solution concentration from about 10 ppm to about 230 ppm.

25. The method of claim 20, wherein the overflow of the chiller processing bath is used in the production of products for human consumption during an upstream operation chosen from soaking, dipping, quenching, rinsing, scalding, washing, cooling, or heating.

26. The method of claim 20, wherein the chiller processing tank comprises a means for maintaining a water temperature such that the production of products for human consumption reaches a temperature below about 40° F.

* * * * *